Patented July 10, 1951

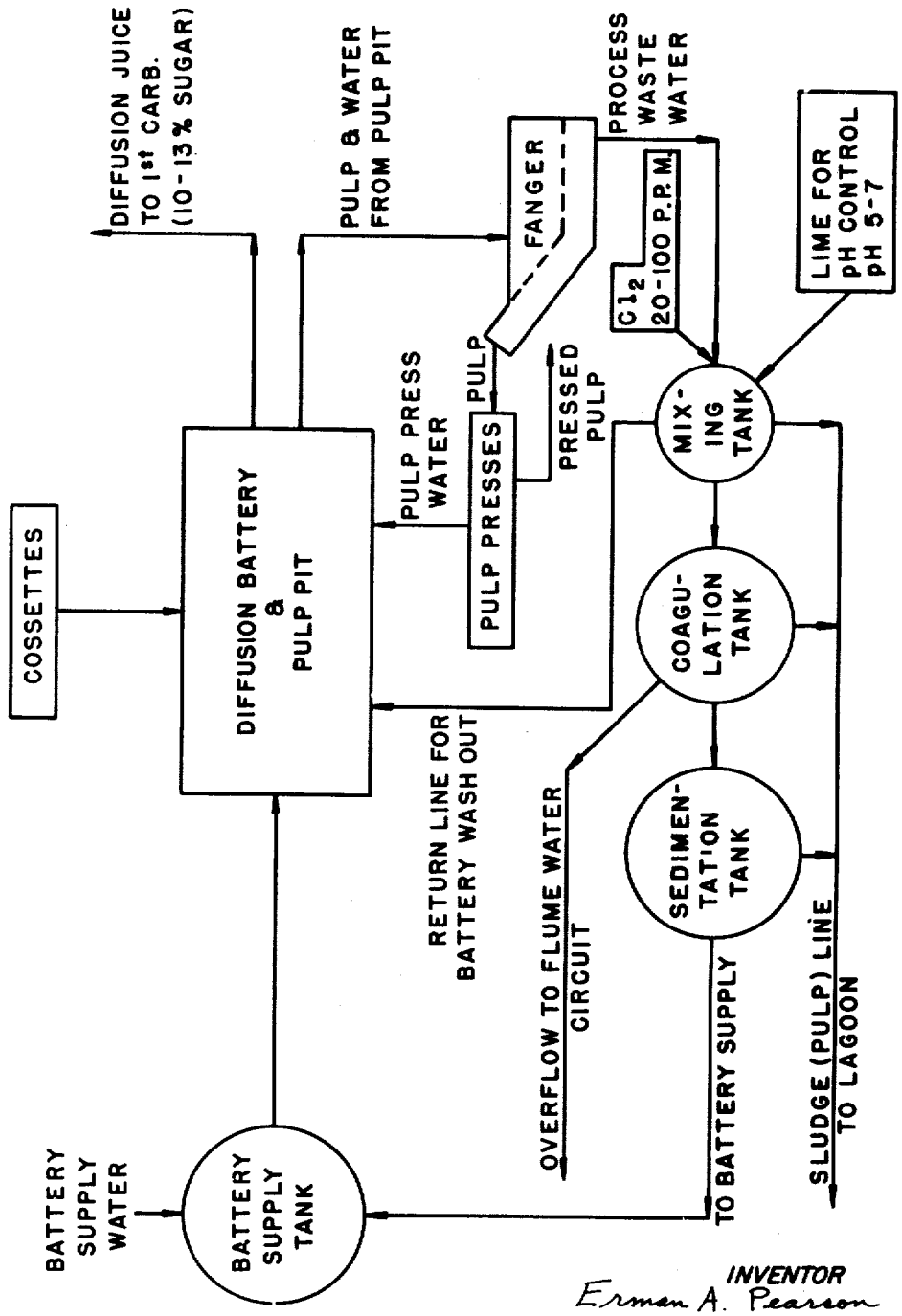

2,560,125

UNITED STATES PATENT OFFICE 2,560,125

TREATMENT OF SUGAR PROCESS WATER

Erman A. Pearson, Bothell, Wash., assignor to Research Corporation, New York, N. Y., a corporation of New York Application June 15, 1949, Serial No. 99,282

7 Claims. (Cl. 127—44)

This invention relates to the extraction of sugar from beets by the diffusion process, and more particularly to a novel process for treatment of the diffusion process waste waters with chlorine in such quantities and under such conditions as to promote a threefold reaction of oxidation of undesirable sugars and organic non-sugars, defecation of proteins, and disinfection of bacteria, whereby the said process waste waters may be re-utilized in the diffusion process, stream pollution by process waste water thereby eliminated, plant operation improved, sugar recovery thereby enhanced both in total volume and in the ratio of recoverable granular sugar to sugar in the molasses, and substantial amounts of heat and water thereby saved.

Since the start of modern commercial extraction of sugar from beets in 1802, the industry has been plagued by the problem of stream pollution. Many attempts have been made to solve the problem, and much costly research has hitherto been conducted without avail in the search for an economic abatement of the nuisance. Previous attempts include filtering the waste waters, biological oxidation of waste waters in percolating filters, treatment by the activated sludge process, treatment with chemical coagulants such as lime, controlled fermentation in tanks and ponds, and others. Attempts have previously been made to recirculate the waste waters back into the diffusion process rather than discharge it to waste. However, none of these methods have hitherto been commercially feasible as will be further demonstrated below and the problem has been extremely critical.

In order to illustrate why such previous attempts have not been commercially feasible and for the purpose of better understanding my invention, a brief discussion of the diffusion process will best serve as an introduction.

In general, the process starts with floating sugar beets into the plant, washing them, and slicing them into thin strips called cossettes. Cossettes are then loaded into the diffusion battery which generally comprises from 10 to 14 large tanks or cells connected in series and each holding in the neighborhood of three tons of beets. Essentially fresh, battery supply water, is then pumped into the battery at a temperature of about 60° C., and passed in series from one cell to the other. Between successive cells the water is passed through heat exchangers to control the temperature of the water for the most efficient operation. The water, passing in intimate contact with the cossettes, extracts the sugar therefrom, gradually gaining in concentration. Upon its exit from the last cell in the chain, the concentrated water is called diffusion juice and contains roughly from 10% to 13% sugar. Extraction takes place more rapidly when the difference between the concentration of sugar in the water and sugar in the cossettes is greatest, and therefore, during continuous operation the cell having the more nearly spent cossettes is the cell into which the fresh battery supply water is introduced. When the cell at the head of the line becomes spent, the cossettes, thereafter called pulp, along with the remaining water in the cell are dumped through gates in the bottom of the cell into a pit underneath the battery which provides a common collection point for all waste dumped from the cells. Generally there are three or four cells not in use by virtue of their being dumped, washed, and re-loaded with cossettes but as soon as each succeeding cell is made ready, it is cut into the end of the line with the highest concentration of diffusion juice passing through it and out into the remaining sugar refining stages. Since this invention relates primarily to the diffusion battery, the subsequent refinement stages will not be further described.

During the beet sugar refining season or campaign, as it is called, the diffusion battery is operated continuously twenty-four hours a day being dumped approximately every four minutes. After a cell is dumped, the spent pulp is floated to an apparatus called a fanger, which serves, by a screening mechanism, to separate a large majority of water from the pulp, and thereafter the pulp is passed through a press where the remaining water is pressed therefrom. Other small quantities of water are also collected in the pit underneath the cells and include water amployed in washing out the cells, and water coming from random leaks in the operative cells. Collectively, these waters are herein called "process waste water." All together, the process waste water amounts to approximately 1,000 gallons each four minutes, and therefore it will be seen that approximately 360,000 gallons of water will be so dumped each day's operation.

The over-all process of extracting sugar from beets gives rise to several other sources of waste water. These include the flume water employed in floating the beets to the plant, lime-cake slurry which follows the carbonization process of a later stage in the sugar refining, condenser water, and another type of waste known as Steffen's waste. On the whole, these other waste waters do not present any major problem, but the process waste is by far the most obnoxious and presents the most cogent problem in the industry. This is because the process waste water contains a large quantity of matter requiring oxidation for purification. Or expressed in other terms, it has a biological oxygen demand (B. O. D.) of between 1,000 p. p. m. and 2,000 p. p. m. and a chemical oxygen demand (C. O. D.) of 1,500 p. p. m. to 2,500 p. p. m. Furthermore, since the beet sugar campaign takes place during the late summer and early fall months when the streams are apt to be at their lowest, stream pollution is extremely critical.

Stream pollution, however, is not the only concern in the industry with respect to the process waste water. In the first place, the simple fact of wasting 360,000 gallons of water daily represents a substantial economic loss. Furthermore the process waste water contains in the neighborhood of two to four pounds of sugar per ton of beets sliced, which although relatively small percentagewise in the water, amounts to approximately two tons of sugar a day. Also the process waste water exits from the plant at a temperature in the neighborhood of 50° C., and thereby at 360,000 gallons a day represents a substantial thermal loss.

In fine, in addition to the pollution problem there are strong economic reasons for finding a way to re-use the process waste water in the extraction process. Many attempts have been made to re-use this waste water but there are several important obstacles to such re-use which were hitherto thought insurmountable. In the first place, the numerous impurities in the process waste water cause the cells to clog and disrupt the normal flow of the water through the cossettes. This has been partially controlled in the past by filtering the waste water before re-introduction. Filtering, however, is unsatisfactory because it cannot eliminate the dissolved or colloidal undesirable sugars such as glucose and organic non-sugars in the process waste water. These undesirable sugars and organic non-sugars interfere seriously with the production of granulated sugar and increase the percentage of sugar in the form of molasses during final refinement stages. Furthermore, the waste water contains certain highly destructive thermophilic bacteria which at 55° C. cause up to thirty times more fermentation than do mesophilic organisms at 20° C. Fermentation results in the inversion of sugars from sucrose to glucose and fructose, as well as causing the production of gas in the cells which greatly hinders circulation, and therefore it is highly undesirable. These bacteria also cause a rapid lowering of the pH of the diffusion juice and the possibility of loss of sugar thereby. Attempts have been made to eliminate these bacteria by boiling the process waste water, but the cost of such heating is prohibitive under normal circumstances, and furthermore, boiling does not eliminate the undesirable sugars and organic non-sugars. In the past any substantial amount of re-use of the process waste water has caused extreme interference with diffusion battery operation, requiring the plant to stop periodically, dump all cells and scald them before recommencing operations.

The harmful effects of re-circulation have for the most part driven the industry to discard it as a remedy for the problem and to concentrate research upon disposal outside of the plant. Some plants have constructed large lagoons where the waste water is dumped. In such lagoons, the waste water soon ferments and subjects the entire surrounding district to obnoxious odors. Other attempts mentioned above include biological oxidation in percolating filters and by the activated sludge process, treatment with lime, and controlled fermentation in tanks. In view of the large volume of waste water, none of these methods have been commercially feasible. And to further evidence the failure of the industry to develop a satisfactory solution of this problem, it is of note that certain State Departments of Health have recently issued orders to beet sugar factories to abate the pollution of streams or else cease operations.

It is an object of my invention to provide a process for treating the process waste water whereby it may be recirculated continuously into the battery supply water without giving rise to harmful effects in the battery cells themselves, and without impairing in any way the extraction of sugar from the end product of the diffusion battery. It is a further object of my invention to completely eliminate the necessity for dumping the process waste water into sewers or streams and thereby to save the water and the heat therein. It is a further object of my invention to provide a process for the continuous re-use of the process waste water whereby the sugar content therein may be recovered, whereby loss of sugar through inversion is substantially eliminated, and whereby the purity of the diffusion juice is increased.

In the accomplishment of these objects I segregate the process waste waters and treat the same with controlled quantities of chlorine to substantially eliminate the thermophilic and mesophilic organisms therein, to act as an agent in the oxidation of undesirable sugars and readily oxidizable organic non-sugars, and to defecate both organic and inorganic non-sugars in the waste water. Thereafter, I re-introduce the process waste water back into the battery supply tank for re-use in extraction. After such treatment the process waste water is free from fermentation and multiplication of bacteria in the diffusion battery. In addition, since the organic non-sugars are largely coagulated by the chlorine, they are removable by sedimentation or in effect filterable by the cossettes, and therefore the purity of the diffusion juice is in no way lowered by the re-introduction of the process waste water and it may even be raised. This is accomplished without any significant clogging or channeling in the cells. And finally the oxidation of undesiderable sugars and organic non-sugars renders them removable by carbonation at a later stage in the refinement.

It is a further feature of my invention that the chlorine is introduced into the process waste water under conditions of controlled pH whereby the optimum coagulation of organic non-sugars may be obtained under conditions of pH not sufficiently low to cause inversion of sucrose into fructose and glucose.

Further objects and features of my invention will best be understood from the following description of a preferred embodiment thereof, selected for purposes of illustration, and shown in the accompanying flow diagram.

The preferred embodiment of the process of my invention is directed towards the treatment and re-utilization of the process waste waters of the diffusion battery. The apparatus employed is standard throughout and includes a diffusion battery having a plurality of cells, a pulp pit into which the spent cossettes thereafter called pulp are dumped, conduits through which the pulp is floated, a fanger which serves to separate a large part of the water from the pulp, pulp presses which extract a majority of the remaining water from the pulp, and a recycling system for the process waste water, indicated in the flow diagram following the fanger. While such apparatus, with the exception of the latter mentioned recycling system, is conventional in beet sugar factories which operate what is known as a "straight house," it will be understood that the process of my invention is not limited to any specific type of diffusion apparatus.

With reference to the flow diagram, it will be seen that the cosettes, the battery supply water, the battery wash water, and the pulp press water all enter the area marked for the battery and pulp fit. Also it will be seen that the diffusion juice, and the pulp and water from the pulp pit leave the battery and pulp pit. It will be understood that conventional diffusion battery practice is employed with the battery supply water first entering the cell containing the most nearly spent cossettes, and with the diffusion juice being drawn off at the other end of the cell line. When spent cells are dumped, (at intervals of about once every four minutes), the cossettes and water in the cell at that time, drop down into the pulp pit. Thereupon the cell is washed out with the water used for such purpose also dropping down into the pit. Normally it is desirable to have additional water in the pulp pit for the purpose of floating the pulp to the fanger, and in order to supply this, the pulp press water is dumped into the pulp pit along with the battery wash water. It will be understood that there is no particular order for the introduction of these components into the pulp pit, and that the operation is substantially continuous.

At the fanger, a large part of the water is separated from the pulp by fine mesh screens, whereupon the pulp passes to the pulp presses and the water from the fanger is carried forward for treatment as will be described presently. In htis preferred embodiment of my invention only the water issuing from the fanger is treated, but it will likewise be seen that this water will include both the battery wash water and the pulp press water which accompany the pulp into the fanger. There is little chance that the pulp press water or battery wash water entering the fanger along with the pulp will recirculate back in any substantial quantity into the pulp presses because the fanger is quite effective in separating free water from the pulp leaving only that water which is soaked up in the pulp. Furthermore, passing the pulp press water through the fanger in the presence of more pulp has a beneficial effect in separating suspended matter from the said pulp press water.

In total volume the process waste water amounts to about 360,000 gallons a day for an average factory slicing 1,000 tons of beets a day. Furthermore, it represents about ⅓ of the battery supply water while the diffusion juice represents about ⅔ of the said battery supply water. In addition it should be borne in mind that the process waste water has a temperature of about 50° C., contains highly destructive thermophilic organisms, contains from two to four pounds of sugar per ton of beets sliced, has a B. O. D. of between 1,000 and 2,000 p. p. m., and has a C. O. D. of between 1,500 p. p. m. and 2,500 p. p. m. If such water were reintroduced into the diffusion battery, the diffusion juice purity would drop markedly, the thermophilic organisms would multiply rapidly (more than thirty times the rate of mesophilic bacteria at 20° C.), and the pH of the diffusion juice would drop rapidly with a consequent loss of sugars through inversion. However by treating this water with chlorine in controlled quantities, by maintaining the pH within given limits, and by allowing the water so treated to stand for a short while, three important functions are brought about, namely: oxidation of certain objectionable sugars and organic non-sugars, coagulation of protein material, and disinfection of bacteria. If properly carried out within ranges which will be described presently such treatment of the process waste water renders it perfectly suitable for re-introduction into the battery supply tank, and not only are the above harmful effects eliminated and the heat and sugar in the said water recovered, but the purity of the diffusion juice actually is improved.

The treatment process herein described is carried out by passing the said waste waters through three large tanks indicated on the flow diagram as a mixing tank, a coagulation tank and a sedimentation tank. Chlorine is added to the process waste water at the point of entrance into the mixing tank and the resultant solution is subjected to a mild turbulence to ensure adequate mixing. Once the chlorine is introduced, the three-fold function mentioned above commences to take place. It will be understood that oxidation of objectionable sugars and organic non-sugars and disinfection of bacteria take place in all three tanks. Also sedimentation of both protein material and separable solids takes place in each tank, and for this reason, each tank is provided with a sump and sludge outlet line for elimination of sediment.

With reference to the flow diagram, it will be noted that the water employed for washing out the spent cells in the battery is taken from the mixing tank, and that, because of this, a certain small amount of free chlorine will enter the process waste water prior to its leaving the pulp pit. This fact, while not controlling, has definite advantages in preventing multiplication of bacteria prior to treatment in the mixing tank.

Turning now to the preferred amount of chlorine to be introduced into the process waste water, and to the preferred pH range limits, four factors must be considered. First, sufficient chlorine must be introduced effectively to eliminate the bacteria as well as to act adequately as an agent in the oxidation of objectionable sugars and organic non-sugars. The reaction of oxidation tends rapidly to reduce the disinfecting capacity of the chlorine with the result that an unexpectedly large quantity of chlorine must be employed. In general, sufficient chlorine to leave 2 p. p. m. free available chlorine residual after ten minutes contact will give adequate disinfection, and under normal conditions this requires upwards of 20 p. p. m. chlorine introduced into the mixing tank. Secondly, in order to obtain the optimum conditions in the coagulation of protein material, the pH of the solution should preferably be kept in the neighborhood of the mean iso-electric point of the protein material to be coagulated. Normally, a pH range of 5 to 7 is satisfactory with a pH of 6 representing the optimum. Therefore, too much chlorine may be harmful if it brings the pH of the solution below 5. Generally speaking, over 100 p. p. m. will be too much with respect to lowering the pH, and also over 100 p. p. m. might result in undesirable chlorides in the final product. Thirdly, since inversion of sugars takes place in the pH ranges below 5, and also since the pH of the solution may be low to start out with before the introduction of chlorine, it may be necessary to introduce lime into the mixing tank along with the chlorine to keep the pH above 5. Fourthly, chlorine is a coagulating agent apart from considerations of the pH of the solution, and therefore it should likewise be present in the solution in sufficient quantities to be effective as such. Quantities upwards of 20 p. p. m. are necessary for this purpose. Thus, with the introduction of between 20 and 100 p. p. m. of chlorine, and with the pH of the solution being maintained between 5 and 7 by the introduction of lime if necessary, the conditions for oxidation, coagulation, and disinfection may be attained.

In view of the extreme dilution of the solution, the introduction of lime does not appreciably reduce the coagulating, oxidating or disinfecting effects of the chlorine. Of course it will be understood that it is a practical impossibility to state exactly what takes place in the solution. However, five day B. O. D. removal and C. O. D. removal tests of average samples of process waste water demonstrate that chlorine is distinctly effective independently of pH control. At a pH of 5 without any chlorine, the natural five day B. O. D. removal was 21%. It was increased, however, to 59% by the addition of 25 p. p. m. of chlorine together with sufficient lime to keep the pH at 5. At a pH of 6 without any chlorine, a 57% C. O. D. removal was attained, but by the addition of 25 p. p. m. of chlorine and sufficient lime to keep the pH at 6, the C. O. D. removal was increased to 80%. With the same sample, 50 p. p. m. of chlorine and additional chlorine to maintain the pH at 6 gave a removal of 82%.

It is to be understood that this process is not to be limited to the use of lime alone as a base control for pH. Calcium carbonate, sodium carbonate or equivalent commonly known neutralizing agents may likewise be employed.

It should be noted that coagulation of protein material does not represent the only elimination of impurities caused by the coagulating function of the chlorine, but that certain organic and inorganic impurities are defecated along with the organic proteins by agglomeration and adsorption.

With respect to the oxidation of undesirable sugars, it is believed that a typical reaction is that of the transformation of glucose to gluconic acid, which may be expressed as follows:

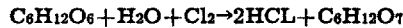
$$C_6H_{12}O_6 + H_2O + Cl_2 \rightarrow 2HCL + C_6H_{12}O_7$$

As glutonic acid the undesirable glucose is more readily eliminated in the carbonation process.

The removal of undesirable sugars and organic non-sugars by coagulation and oxidation has been demonstrated by tests made before and after commencing operations under the process herein described. During the period before treatment was started, the average combined removal of these impurities by the battery itself and by carbonation was 61%. Whereas, after treatment was started, the average combined removal by the battery and by carbonation increased to 68%. The resultant increase in purity has important consequences in increasing the ratio of granular sugar to sugar in the molasses.

The harmful bacteria in the process waste water may be classed generally as facultative aerobic bacilli and thermophilic anaerobes. Laboratory experiments have demonstrated that a chlorine concentration which leaves 1 to 2 p. p. m. free available chlorine residual after ten minutes contact is effective to eliminate upwards of 99.7 of the said bacteria. As a result, process waste water so treated does not ferment and drop in pH as rapidly as untreated process waste water does. Thus, a substantial saving is attained through a reduction in the inversion of sugars normally caused by the bacteria.

With respect to the time of detention of the treated process waste water before re-introducing it into the battery supply tank, from 20 to 40 minutes is desirable. However, such a length of time is not mandatory. Once substantial contact with the chlorine is made prior to re-introduction, the beneficial effects will commence to take place and re-introduction will be feasible. Coagulation, oxidation, and disinfection will continue to take place in the diffusion battery itself particularly if some chlorine residual is still present. It is of importance, however, to treat the process waste water separately, and thoroughly to mix it with chlorine in sufficient quantities prior to dilution with the battery supply water.

It will be evident to those skilled in the art that minor departures from the precise limits of the preferred process herein described can be made without departing from the spirit of the invention. For instance, the pulp press water might readily be admitted to the mixing tank along with the water from the fanger, rather than entering it into the pulp pit. Furthermore, the pulp press water might be treated separately under conditions as set forth above and re-introduced into the diffusion battery.

Having thus described an illustrative embodiment of the process of my invention, what I claim as new and desire to secure by Letters Patent of the United States is:

1. In the extraction of sugar from beets by diffusion the process of re-utilizating the process waste water for the purpose of further extraction of sugar consisting in the following steps: collecting the process waste water, adding thereto from 20 to 100 p. p. m. of chlorine, controlling the pH of the process waste water and chlorine mixture between a pH of 5 and 7, separating solid matter from the said mixture, and reintroducing the said mixture into the diffusion process.

2. In the extraction of sugar from beets, the process of treating the process waste water with sufficient chlorine to provide at least 1 p. p. m. free available chlorine residual after a ten minute contact period, controlling the pH of the said process waste water and chlorine solution between pH 5 and pH 7, and re-utilizing the said process waste water in the extraction of sugar.

3. In the extraction of sugar from beets, the process of treating the process waste water with chlorine for coagulation of protein material, for oxidation of undesirable sugars and organic non-sugars, and for disinfection of bacteria, consisting in adding to the said waste water sufficient chlorine to provide at least 1 p. p. m. free available chlorine residual after a ten minutes contact period, retaining the said waste water in a semi-stagnant condition for settling out coagulated and suspended matter, and then re-utilizing the said waste water in the extraction of sugar.

4. In the extraction of sugar from beets, the process of treating the process waste water with chlorine for coagulation of protein material, for oxidation of undesirable sugars and organic non-sugars, and for disinfection of bacteria, consisting in adding to the said waste water sufficient chlorine to provide at least 1 p. p. m. free available chlorine residual after a ten minutes contact period, controlling the pH of the said waste water between pH 5 and pH 7, retaining the said waste water in a semi-stagnant condition for settling out coagulated and suspended matter, and then re-utilizing the said waste water in the extraction of sugar.

5. In the extraction of sugar from beets, the process of coagulation of protein material from the process waste water consisting in adding to the said waste water between 20 and 100 p. p. m. of chlorine, retaining the said waste water for a limited coagulation period, and re-utilizing the said waste water in the extraction of sugar, whereby undesirable sugars and organic non-sugars are oxidized, and thermophilic bacteria are substantially eliminated.

6. In the extraction of sugar from beets, the process of treating the process waste water with chlorine for coagulation of protein material, for oxidation of undesirable sugars and organic non-sugars, and for disinfection of bacteria, consisting in adding to the said waste water sufficient chlorine to provide at least 1 p. p. m. free available chlorine residual after a ten minutes contact period, controlling the pH of the solution between pH 5 and pH 7 by the addition of a basic material, retaining the said waste water in a semi-stagnant condition for settling out coagulated and suspended matter, and then re-utilizing the said waste water in the extraction of sugar.

7. In the extraction of sugar from beets, the process of treating the process waste water with chlorine for coagulation of protein material, for oxidation of undesirable sugars and organic non-sugars, and for disinfection of bacteria, consisting in adding to the said waste water sufficient chlorine to provide at least 1 p. p. m. free available chlorine residual after a ten minutes contact period, controlling the pH of the solution to approximate the mean iso-electric point of the proteins to be coagulated, retaining the said waste water in a semi-stagnant condition for settling out coagulated and suspended matter, and then re-utilizing the said waste water in the extraction of sugar.

ERMAN A. PEARSON.

REFERENCES CITED

The following references are of record in the file of this patent:

UNITED STATES PATENTS

| Number | Name | Date |
|---|---|---|
| 207,271 | Frezon et al. | Aug. 20, 1878 |
| 1,591,879 | Ochi | July 6, 1926 |
| 1,956,260 | Wadsworth | Apr. 24, 1934 |
| 1,989,156 | Sanduz | Jan. 9, 1935 |

FOREIGN PATENTS

| Number | Country | Date |
|---|---|---|
| 349,930 | France | May 20, 1905 |

OTHER REFERENCES

"Sugar" (1) ("The Daniel Sterilization Process . . . ") November, 1947, pp. 30, 31 and 48.

"Sugar" (2) ("Return of Beet Sugar Factory Waste Water") September 1934, pp. 26–29.

The Int. Sugar Jour. November 1940, page 392.

Nolte, "Chlorine—Soda Lye Treatment of Sugar Plant Waste Waters As the Sugar Refinery Teutschenthal" Techn. T. 81, 1931, pp. 595–604.